US007438089B2

(12) United States Patent
Allegretti

(10) Patent No.: US 7,438,089 B2
(45) Date of Patent: Oct. 21, 2008

(54) HYDRAULIC PILOT CONTROL UNIT WITH OSCILLATION DAMPING SYSTEM

(75) Inventor: Mirco Allegretti, Reggio Emilia (IT)

(73) Assignee: Walvoil S.p.A., Reggio Emilia (IT)

( * ) Notice: Subject to any disclaimer, the term of this patent is extended or adjusted under 35 U.S.C. 154(b) by 55 days.

(21) Appl. No.: 11/581,579

(22) Filed: Oct. 17, 2006

(65) Prior Publication Data

US 2007/0089793 A1 Apr. 26, 2007

(30) Foreign Application Priority Data

Oct. 20, 2005 (IT) .......................... PR2005A0062

(51) Int. Cl.
*F16K 11/16* (2006.01)

(52) U.S. Cl. .................... 137/636.1; 137/627.5; 251/51

(58) Field of Classification Search .............. 137/636.1, 137/627.5; 251/54, 51
See application file for complete search history.

(56) References Cited

U.S. PATENT DOCUMENTS 5,251,660 A * 10/1993 Hori et al. ................ 137/636.1
5,566,716 A * 10/1996 Togashi et al. ........... 137/636.1
5,682,922 A * 11/1997 Galazin et al. ........... 137/627.5
5,787,932 A * 8/1998 Pierce ..................... 137/627.5

FOREIGN PATENT DOCUMENTS

EP 0 716 235 6/1996

* cited by examiner

*Primary Examiner*—Kevin Lee
(74) *Attorney, Agent, or Firm*—Young & Thompson

(57) ABSTRACT

The present invention relates to the field of units for hydraulic pilot control of directional-control valves used in the fabrication of mobile vehicles and particularly relates to a hydraulic pilot control with an oscillation damping system. Connections are provided among the chambers in the pilot control unit to provide a damping effect in the actuation stroke, thereby preventing any oscillation: the provision of such connections among the chambers has the function of preventing air stagnation; this arrangement prevents any undamped behavior due to incomplete filling upon installation or to air transported in the hydraulic fluid.

10 Claims, 4 Drawing Sheets

PRIOR ART

PRIOR ART

A
B
C
1a
20
2
3
4
5
6
7
8
9
10
11
12
13
14
L1
L2
LP
LS
P
T

HYDRAULIC PILOT CONTROL UNIT WITH OSCILLATION DAMPING SYSTEM

BACKGROUND OF THE INVENTION

The present invention relates to the field of units for hydraulic pilot control of directional-control valves used in the fabrication of mobile vehicles and particularly relates to a hydraulic pilot control with an oscillation damping system.

The pilot control unit is operated by the driver of the mobile vehicle by means of an operating member such as a lever or a pedal.

DESCRIPTION OF THE RELATED ART

The problems of prior art are associated to the oscillatory movements of the operating member and consequently to the fluctuation in the amount of operation of the pilot control.

These oscillations may have various causes: the uncontrolled actuation of the pilot control unit may be caused by the rolling and vibrations of the mobile vehicle caused by the travel or by the abrupt release of the operating mechanism from any operating position.

Besides being a serious operational defect, these oscillations are also a safety problem for operators, as they may cause involuntary and uncontrolled operations of the vehicle on which the pilot control unit is mounted.

FIG. 1 shows a cross sectional view of a typical prior art pilot control unit without any damping system.

Such pilot control unit has a casing 1*a*, with pressure reducing valves operating therein.

Each pressure reducing valve is composed of a spool 8, a pressure spring 2 and a poppet 7 and is operated by a push rod 4, which is in turn actuated by a cam 5 integral with the pilot mechanism 20.

Two chambers are formed in the casing 1*a*: a lower chamber 9, connected to the pump port P via the pressure line and an upper chamber 6, connected to the discharge port T via the discharge line.

Pump port P and discharge port T are situated in the lower portion of the pilot control unit.

More specifically, the upper chamber 6 is connected to the discharge port T through a hole 10 in the lower portion of the chamber.

Disposed in the upper chamber 6 are a return spring 3 that presses the push rod 4 upward and a pressure spring 2 that transmits the pressing force applied from the poppet 7 to the spool 8.

When the cam 5 is made to tilt by the operation of the pilot mechanism 20, the push rod 4 is pressed downward thus operating on the poppet 7; the spool 8 is then pressed downward to its operating position via the pressure spring 2.

A first drawback of this solution is that, during the above-described actuation, the poppet 7 encounters no resistance as the hydraulic oil with air bubbles contained in the upper chamber 6 is pushed by the poppet 7 itself towards the discharge hole 10, thereby providing no damping effect.

During the return stroke, the apparatus composed of the poppet 7, the spool 8, the spring 2 and the push rod 4 is pushed by the return spring 3 in a direction opposite to the actuation one.

During such return stroke, the poppet 7 slides within the upper chamber 6 experiencing a resistance against its movement, thereby producing a damping effect; such resistance is due to the fact that the hydraulic oil is forced to move from the upper to the lower part of the upper chamber 6 through the clearance between the external diameter of the poppet 7 and the internal diameter of the upper chamber 6.

This resistance should be very low, in order to not slow down the apparatus composed of the poppet 7, the spool 8 and the push rod 4 in its return to its neutral position: an excessive resistance would affect a properly safe return to the neutral position.

A further drawback of this prior art pilot control lies in that air bubbles may form in the upper chamber 6 and would considerably reduce the damping effect; as a result, the poppet 7 would not fulfill its damping function during its return stroke.

By the above pilot control configuration, undesired oscillatory movements are only contrasted to a partial extent, whereby the mobile vehicle on which the pilot control unit is mounted may still be operated improperly.

In prior art, pilot control units that can obviate oscillation problems are already provided; the features of such units are shown in FIG. 2.

This prior art hydraulic valve is disclosed in U.S. Pat. No. 5,566,716.

The pilot control of FIG. 2 has additional damping pistons 1 which operate in combination with the push rods; additional damping springs 2 have the function of pushing up the damping pistons 1 during the return stroke of the pilot control.

Nevertheless, this solution has the disadvantage of increasing the force required to operate the pilot control unit, the number of components of the pilot control itself and hence its cost.

SUMMARY OF THE INVENTION

Object of the present invention is to prevent the above described oscillatory motions, by adding a damping system to the pilot control unit. A further advantage of the invention is the dramatic reduction of fabrication and material costs due to the fact that these oscillations are prevented by means of a damping system having a small number of components, hence a lower cost than prior art solutions.

These objects and advantages are all achieved by the hydraulic pilot control unit with oscillation damping system object of the present invention, which is characterized by what is provided in the below-listed claims.

BRIEF DESCRIPTION OF THE DRAWINGS

These and other features will be better pointed out by the following description of a few embodiments, which are shown merely as a non-limiting example in the enclosed tables of drawing, in which.

DETAILED DESCRIPTION

Figure 1:
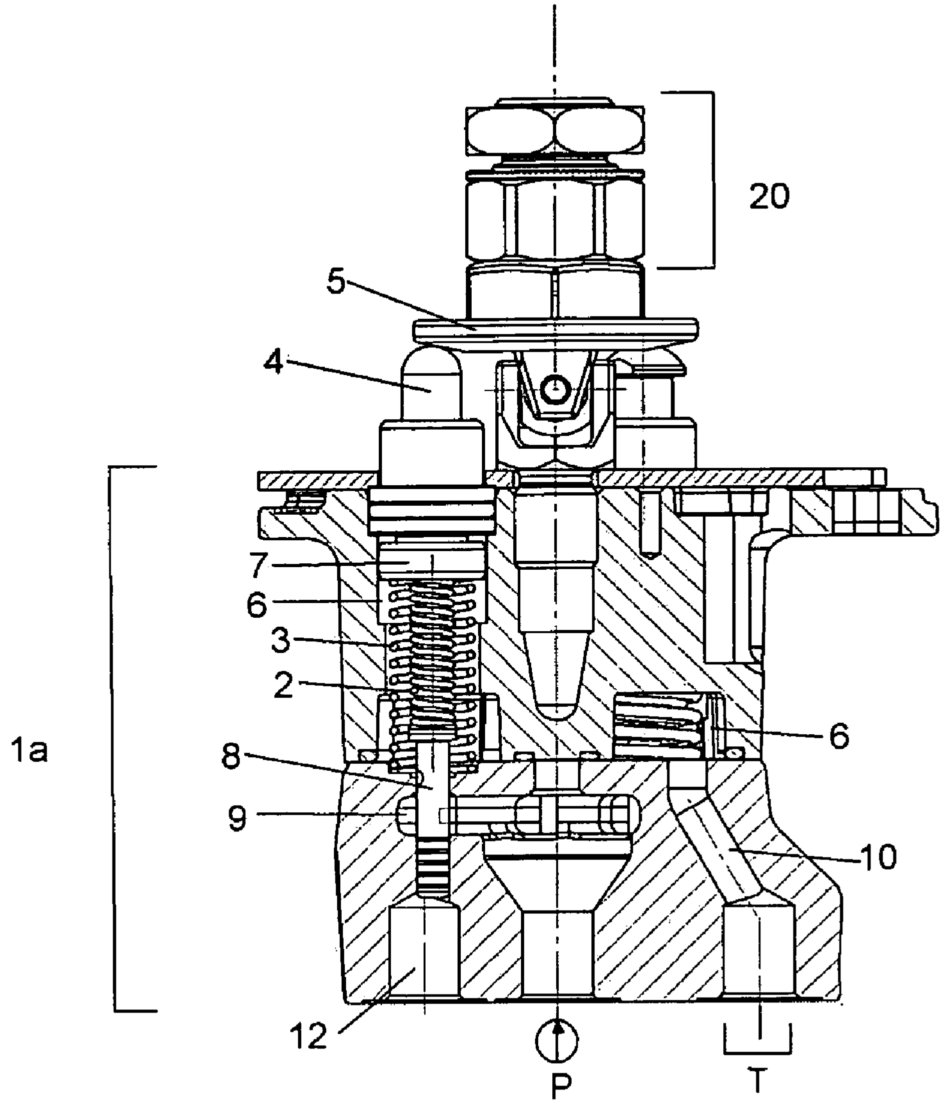
FIGS. 1 and 2 illustrate conventional prior art control units.
Figure 2:
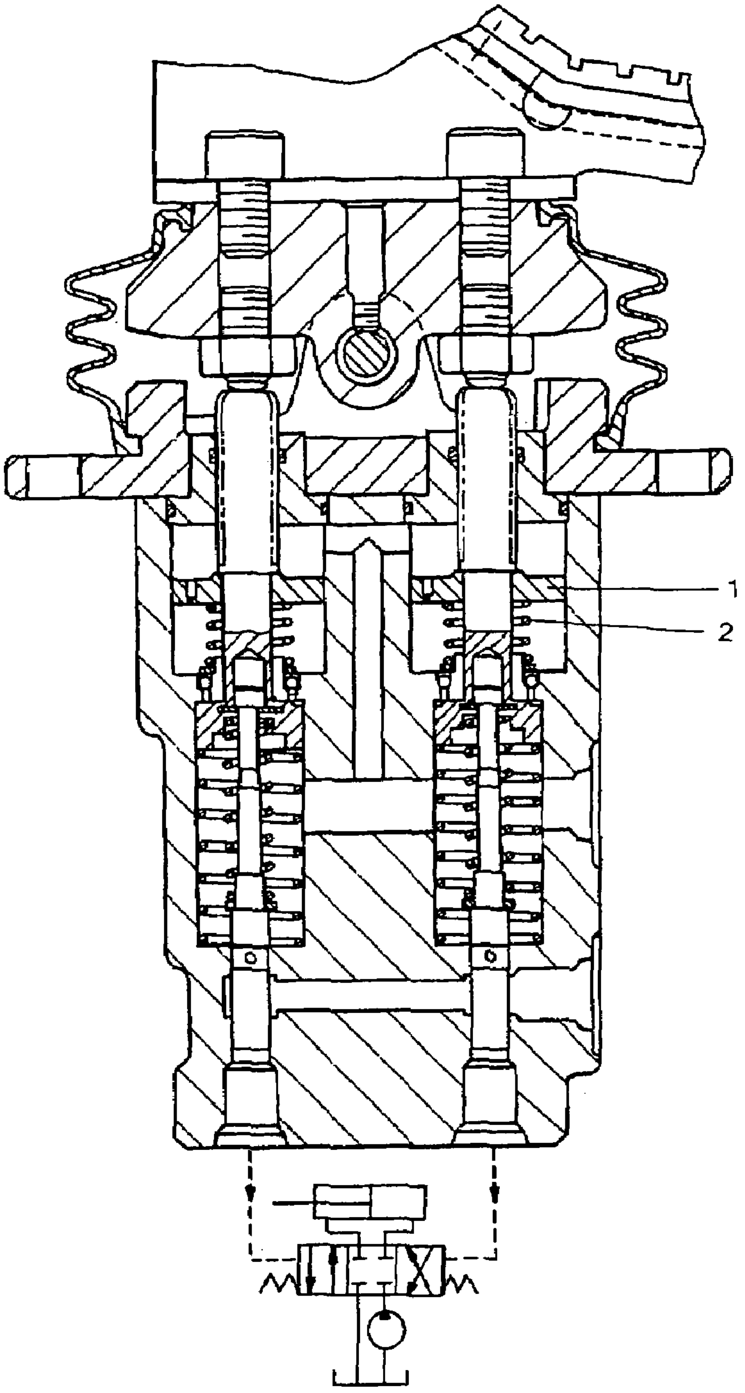
Figures 3, 3A:
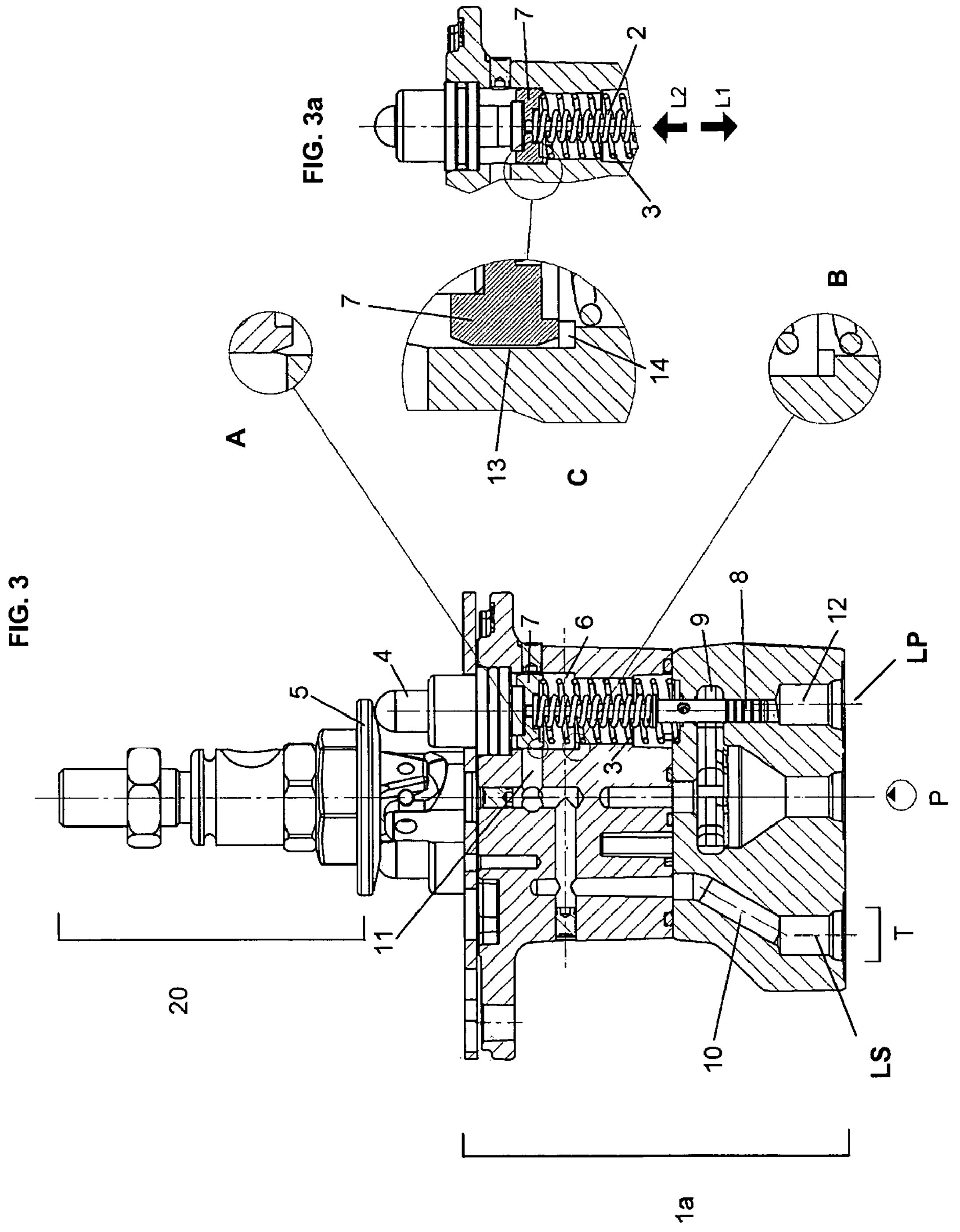
FIG. 3 is a cross sectional view of one embodiment of the pilot control unit with oscillation damping system object of the present invention.
FIG. 3*a* shows a detail of the poppet chamber, particularly in an actuated configuration.

With reference to FIG. 3 the operation of the pilot control unit with damping system according to the present invention is shown.

The pilot control unit with damping system 1 has a casing 1*a*; in the lower portion of the casing 1*a* several ports are displaced: a pump port P, a discharge port T and control ports 12.

Two chambers, one above the other, are formed in the casing 1*a*: a lower chamber 9 and an upper chamber 6.

Lower chamber 9 and pump port P are connected via a pump line LP.

Upper chamber 6 and discharge port T are connected via an ideal discharge line LS, passing through hole 11 and hole 10.

One or more spools 8 slide within the casing 1*a* and have the function of regulating the pressures at the control ports 12; the spool 8 receives pressurized oil from the lower chamber 9 and discharges oil into the upper chamber 6.

Coaxial and concentric springs 2 and 3 are provided in the upper chamber 6; the pressure spring 2 presses the poppet 7 upward against the push rod 4 and the return spring 3 transmits the pressing force applied from the poppet 7 to the spool 8.

The poppet 7, the springs 2 and 3 and a portion of the spool 8 are accommodated in the upper chamber 6.

The pilot control unit 1 is driven by actuating an operating member 20 (a lever or a pedal); motion is transmitted to the cam 5 which can be displaced, from the neutral position that is shown in FIG. 3, in the two directions of arrows L1 and L2 of FIG. 3*a*; arrow L1 corresponds to the actuation stroke and arrow L2 corresponds to the return stroke of operating member 20.

The cam 5 operates the push rod 4, and the latter operates the poppet 7, thereby pressing the pressure spring 2 and operating the spool 8.

The upper chamber 6 of the pilot control unit 1 of the present invention is connected to the discharge port T through the hole 11 (situated in the upper portion of the upper chamber 6, above the poppet 7) and the hole 10 (located in the lower portion of the casing 1*a* of the pilot control unit).

The position of the hole 11 within the casing 1*a* is determined so that it allows hydraulic oil to be discharged only when the upper chamber 6 has been filled to a height above the poppet 7; this specific hole 11 displacement ensures the total filling of upper chamber 6 as well as the easy removal of air bubbles and vapor accumulated in chamber 6 that can be purged through the discharge line LS.

Upon actuation of the pilot control unit 1 in the direction of arrow L1, the cam 5 presses the push rod 4 downwards, and the latter operates on the corresponding poppet 7 to press the pressure spring 2, which in turn presses the spool 8 downwards to its operating position.

During such actuation, the poppet 7 pushes the hydraulic oil in the upper chamber 6 towards the hole 11. In other words, with reference to FIG. 3*a*, it forces the hydraulic oil to flow through the clearance between the external diameter of the poppet 7 and the internal diameter 13 of the upper chamber 6, thereby producing a damping effect.

By adjusting the clearance between the external diameter of the poppet 7 and the internal diameter 13 of the upper chamber 6, several different damping effects may be obtained.

The actuation in direction of arrow L1 of the poppet 7 ends upon abutment against the casing 1*a* at the reduced diameter section shown in FIG. 3*a*.

At this stage, to prevent pressure buildup in the chambers underlying the poppet 7, a groove 14 is formed to provide communication between the lower and upper portions of the upper chamber 6.

During the return stroke of the pilot mechanism 20 (and therefore of the cam 5), the apparatus composed of the poppet 7, the spool 8, the pressure spring 2 and the push rod 4 is pushed by the return spring 3 in a direction L2, opposite to the above actuation direction L1.

At this stage, the poppet 7 slides within the upper chamber 6 without encountering any resistance by the hydraulic oil, as the poppet 7 may directly push the overlying oil into the hole 11 without forcing it through any clearance, while the hydraulic oil returned by the pilot controlled valve fills the underlying chamber.

This configuration effectively contrasts any undesired continuous oscillation, by damping the actuation of the pilot control unit 1 in the direction of arrow L1; the lack of resistance in direction of arrow L2 ensures an optimized operation of the pilot control unit.

Figure 4:
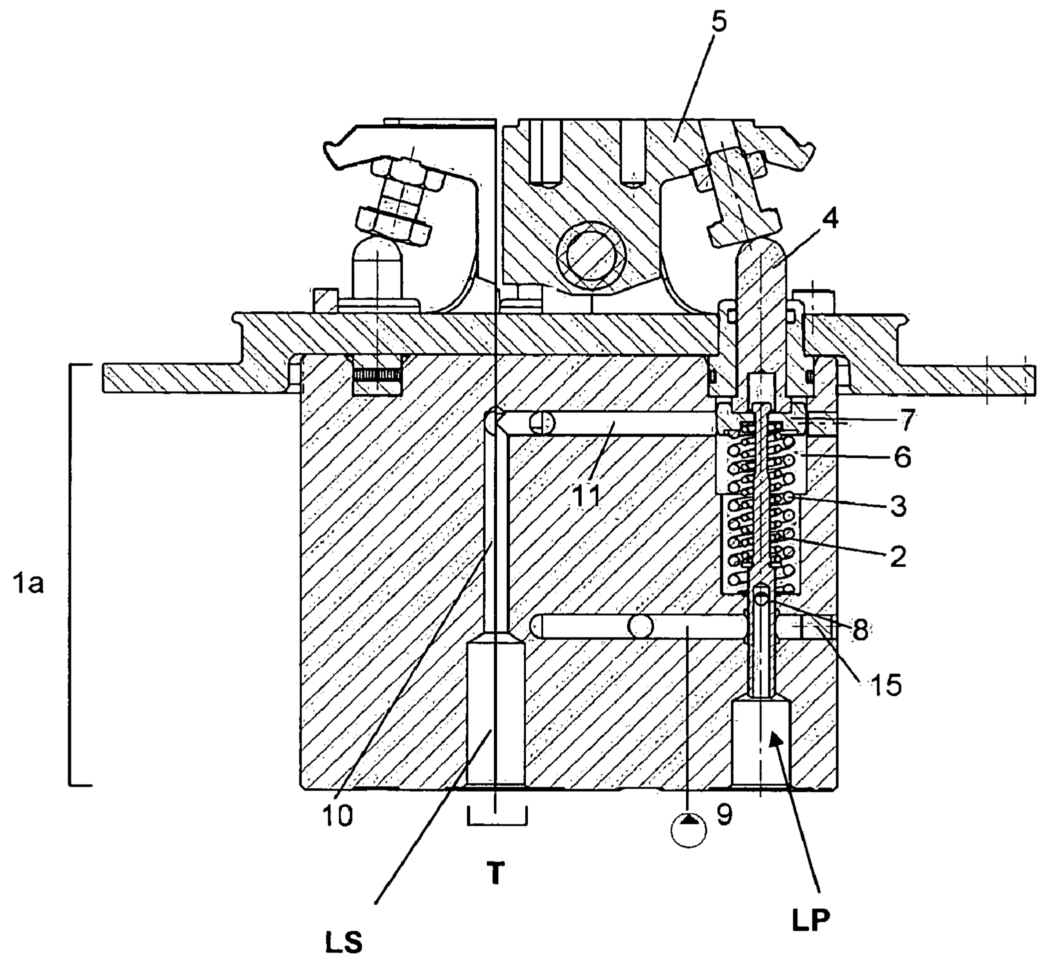
FIG. 4 shows a second embodiment of the pilot control unit with oscillation damping system object of the present invention.

FIG. 4 shows a second embodiment of the pilot control unit with oscillation damping system according to this invention.

This embodiment is characterized by the casing 1*a* being only formed by machine tool processing.

Particularly, upper chamber 6 is put in communication with the discharge port T through the holes 11 and 10 and the lower chamber 9 is itself formed by machine tool drilling. The holes 11 and 9 are isolated from the outside environment by expansion plugs 15.

The invention claimed is:

1. A pilot control unit (1) having an oscillation damping system, which operates by damping an actuation stroke; comprising a casing (1*a*) having two chambers one above the other: a lower chamber (9), connected to a pressure line (LP), and an upper chamber (6), connected to a discharge line (LS); one or more spools (8) that slide within a body, to control pressures at control ports (12); coaxial and concentric springs (2) and (3) provided in the chamber (6), to press a poppet (7) upward against a push rod (4) and to transmit the pressing force applied from the poppet (7) to the spool (8) respectively, wherein, the upper chamber (6) is connected to a discharge port (T) through a discharge hole (11), which is situated in the upper portion of said upper chamber (6), above the poppet (7); upon actuation of a pilot mechanism (20), the poppet (7) pushes the fluid in the upper chamber (6) toward the discharge hole (11), through a clearance between the poppet (7) and a bore (13); the upper chamber (6) being always filled with oil, and allowing damping during the actuation stroke.

2. A pilot control unit (1) as claimed in claim 1, characterized in that by adjusting the clearance between the poppet (7) and the bore (13), several different damping effects may be obtained.

3. A pilot control unit (1) as claimed in claim 1, characterized in that the poppet (7) is used as a damping member.

4. A pilot control unit (1) as claimed in claim 1, wherein the pilot mechanism (20) is a lever- or pedal-operated pilot member (20) providing a motion transmitted to a cam (5) so that the cam (5) drives the push rod (4), and the push rod (4) drives the poppet (7), thereby pressing the spring (2) and driving the spool (8).

5. A pilot control unit (1) as claimed in claim 2, characterized in that the poppet (7) is used as a damping member.

6. A pilot control unit (1) having an oscillation damping system, comprising:

- an operating member (20), operated by one of a lever and a pedal, displaceable from a neutral position in a first direction designated by an arrow L1 and in a second direction designated by an arrow L2;
- a casing (1*a*) with a pump port (P), a discharge port (T), control ports (12) and two chambers located one above the other to define a lower chamber (9), connected to the pump port (P), and an upper chamber (6), connected to the discharge port (T);

one or more spools (8) that slide within the casing (1*a*) regulating pressures at the control ports (12);

a poppet (7), coaxial pressure springs (2) and concentric return springs (3) provided within the upper chamber (6);

the pressure springs (2) pressing the poppet (7) upward and the return springs (3) transmitting a pressing force applied from the poppet (7) to the spool (8), wherein, the upper chamber (6) is connected to the discharge port (T) through a hole (11) situated in an upper portion of said upper chamber (6), above the poppet (7); upon actuation of the operating member (20) in the first direction of the arrow L1, the poppet (7) pushes hydraulic oil in the upper chamber (6) toward the discharge hole (11) forcing the hydraulic oil to flow through a clearance between an external diameter of the poppet (7) and an internal diameter (13) of upper chamber (6) and thus producing a damping effect, the upper chamber (6) being always filled with hydraulic oil.

7. A pilot control unit (1) as claimed in claim 6, wherein, by adjusting the clearance between the external diameter of poppet (7) and the internal diameter (13) of upper chamber (6), several different damping effects may be obtained.

8. A pilot control unit (1) as claimed in claim 6, wherein the poppet (7) is configured as a damping member.

9. A pilot control unit (1) as claimed in claim 7, wherein the poppet (7) is configured as a damping member.

10. A pilot control unit (1) as claimed in claim 6, wherein operation by one of the lever and the pedal on the operating member (20) provides a motion transmitted to the cam (5) so that the cam (5) drives a push rod (4), and the push rod (4) drives the poppet (7), thereby pressing the pressure spring (2) and driving the spool (8).

* * * * *